Figure 1:
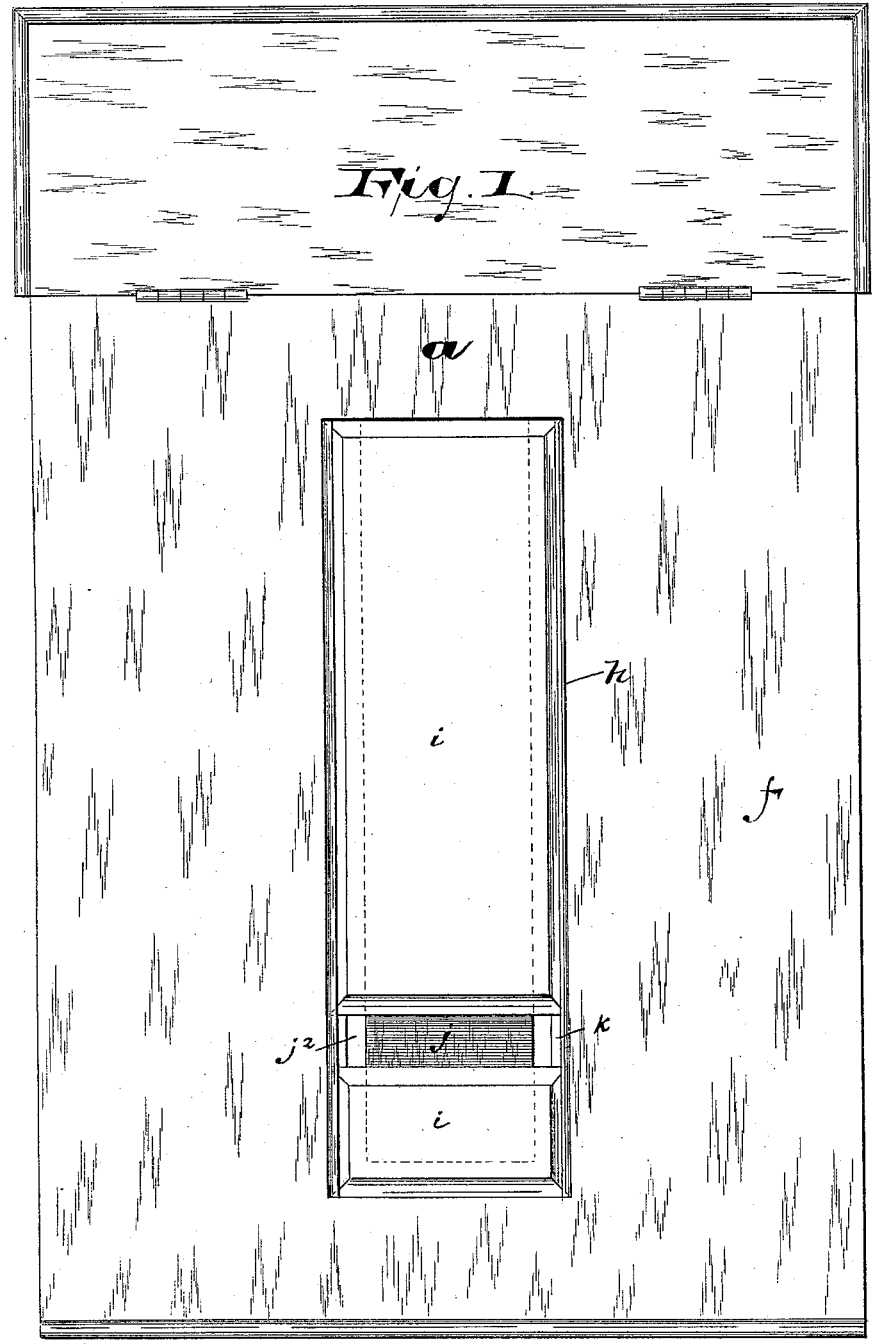

(No Model.) 5 Sheets—Sheet 1.
S. MESSERER.
CASH DRAWER AND DESK.
No. 443,257. Patented Dec. 23, 1890.

WITNESSES: Oscar A. Michel, Alfred Sommer.

INVENTOR: Stephan Messerer,
BY Drake & Co. ATTY'S.

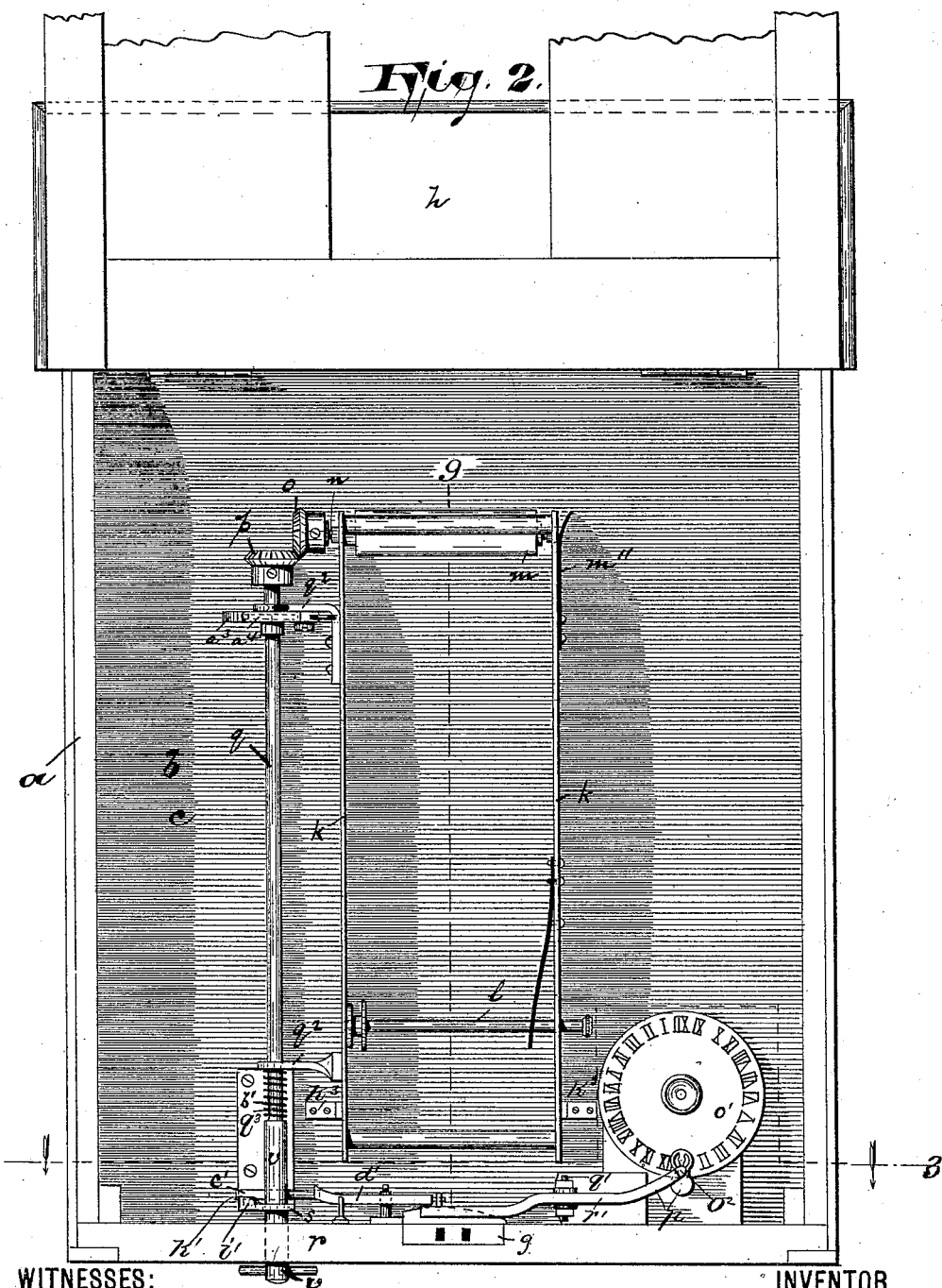

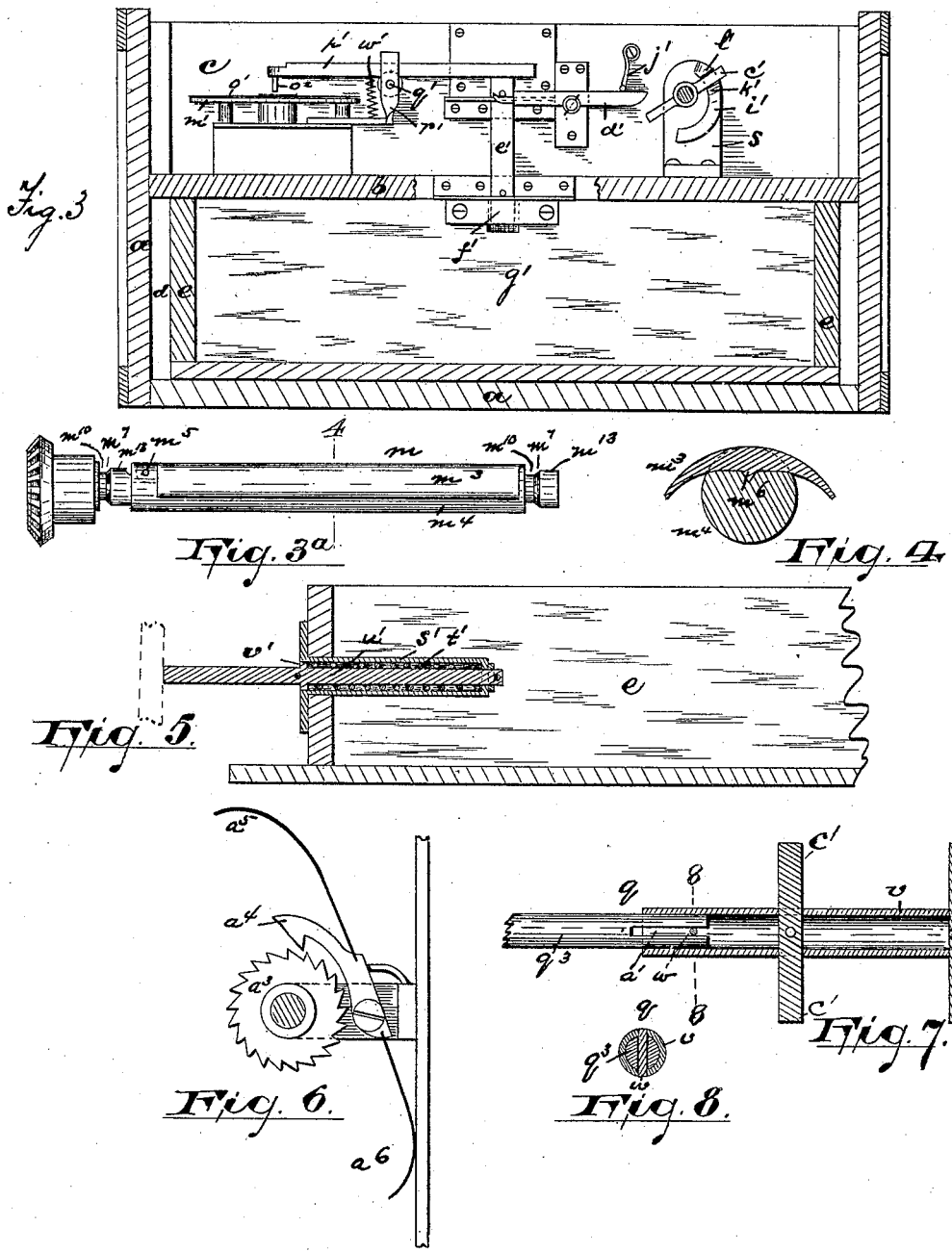

(No Model.) 5 Sheets—Sheet 4.
S. MESSERER.
CASH DRAWER AND DESK.
No. 443,257. Patented Dec. 23, 1890.
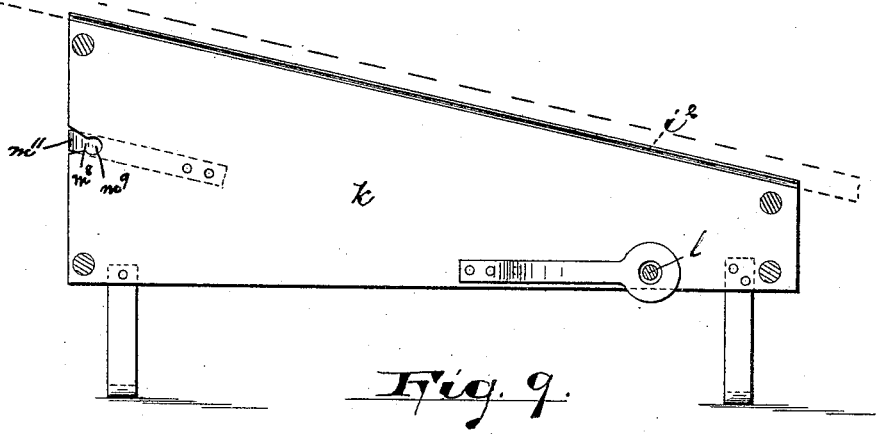
Fig. 9.
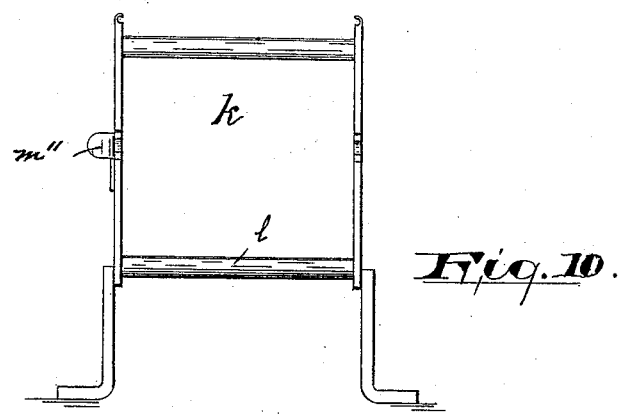
Fig. 10.
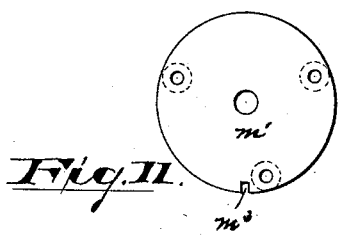
Fig. 11.
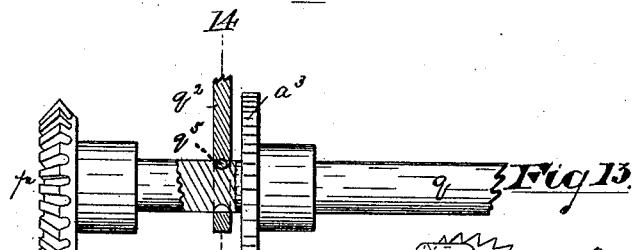
Fig. 13.
Fig. 12. Fig. 14.
WITNESSES: INVENTOR
Oscar A. Mickel
Alfred Sommer
Stephan Messerer,
BY Draker Co ATTY'S.

(No Model.) 5 Sheets—Sheet 5.
S. MESSERER.
CASH DRAWER AND DESK.
No. 443,257. Patented Dec. 23, 1890.
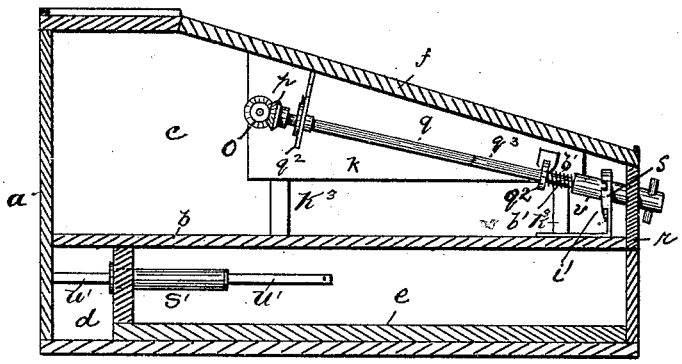
Fig. 14ᵃ
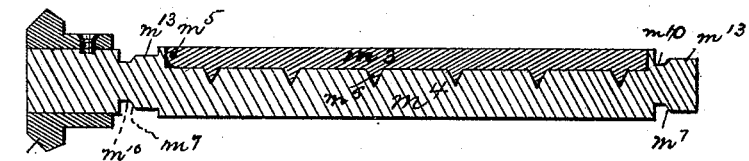
Fig. 15.
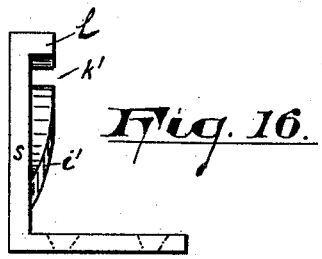
Fig. 16.
Witnesses
Oscar A. Michel
Chas. R. Michel
Inventor
Stephen Messerer.
By Drake & Co. Atty's

UNITED STATES PATENT OFFICE.

STEPHEN MESSERER, OF NEWARK, NEW JERSEY.

CASH DRAWER AND DESK.

SPECIFICATION forming part of Letters Patent No. 443,257, dated December 23, 1890.

Application filed March 6, 1890. Serial No. 342,908. (No model.)

*To all whom it may concern:*

Be it known that I, STEPHEN MESSERER, a citizen of the United States, residing at Newark, in the county of Essex and State of New Jersey, have invented certain new and useful Improvements in Cash Drawers and Desks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to prevent peculation on the part of clerks and employés, to secure a more perfect system, whereby a record may be kept of cash sales, &c., and also a record of the time and other cirumstances attending the opening or closing of the cash-drawer, to secure an automatic time-record and a more simple device for forwarding the recording-ribbon, to reduce the cost of constructing cash-drawers and sale-recorders, and to secure other advantages and results, which will be fully set forth in connection with the description of the working parts.

The invention consists in the improved cash desk and drawer having the arrangements and combinations of parts substantially as will be hereinafter set forth, and finally be embodied in the clauses of the claims.

Referring to the accompanying drawings, in which like letters indicate corresponding parts in each of the several figures, Figure 1 is a plan of the improved device. Fig. 2 is a similar plan, the desk-cover being open to show the interior mechanisms. Fig. 3 is a sectional view taken on line 3 3, Fig. 2. Figs. $3^a$ and 4 are detail views of a winding or motor roll, the latter figure being taken on line 4 4 of the former. Fig. 5 is a detail view of a certain spring and co-operating devices for automatically forwarding the drawer when the same is released or unlocked. Fig. 6 is a detail view of a ratchet-and-pawl attachment for the hand-shaft. Fig. 7 is a detail longitudinal section of a portion of the hand-shaft, and Fig. 8 is a transverse section taken on line 8 8, Fig. 7. Fig. 9 is a section of the ribbon-forwarding mechanism, taken on line 9 9, Fig. 2, the motor or winding roll being removed. Fig. 10 is a rear end view of the frame for said ribbon-forwarding mechanism. Fig. 11 is a detail plan of the disk for the time-indicating dial, and Fig. 12 is an edge view of the same. Fig. 13 is a detail showing the means of preventing longitudinal movement of a portion of the hand-shaft, and Fig. 14 is a section of the same, taken on line 14 14, Fig. 13. Fig. $14^a$ is a sectional view taken on a line parallel with a certain hand-shaft, showing said hand-shaft and co-operating parts more clearly. Fig. 15 is a longitudinal section of the winding or motor roll shown in detail in Figs. $3^b$ and 4, showing the means for clamping or holding the recording paper or ribbon. Fig. 16 is a detail view of a certain bracket or bearing plate, against which a certain cross-bar or bearing of the hand-shaft presses under the influence of a spring on said shaft.

In said drawings, $a$ indicates a cash-desk of any convenient size or shape, and having its interior divided by a partition or flooring $b$ into a chamber for mechanisms for forwarding the paper-ribbon and keeping a time-record, and a cash-drawer chamber $d$, the first chamber being in the upper part of the desk and the second being in the lower part of the desk, below the partition or flooring $b$. Within the chamber $d$, which is open at the front of the desk, is arranged the cash-drawer $e$, which slides in said chamber $d$ in the usual manner.

The recorder-chamber is closed at the top by the hinged cover $f$, which latter is inclined, as shown in Fig. 9, for convenience in writing. Said desk is provided with an ordinary lock $g$ to prevent lifting the said cover by unauthorized persons, and the time-recording mechanisms are thus guarded against improper manipulation. The center of said cover is provided with a large opening $h$, Fig. 2, to receive a transparent plate or plates $i$, which lie flush with the upper face of the inclined cover, so that it may be employed in connection with said upper face as a writing-surface. The glass may be arranged in the cover $f$ or on the frame within the chamber $c$. In the latter event the said frame may be provided at its upper edge with a groove $i^2$, Fig. 9. The transparent plate shows the recording-ribbon $j$ beneath, so that a number of recorded sales or other memoranda may be kept in view for the examination of others than the one making the memorandum, and thus one clerk may readily check the errors of the other.

Within the recorder-chamber is a frame $k$, which may be secured on standards or legs $k^3$, as in Figs. 9 and 10, or in any other manner. Said frame provides bearings for a pay-out or storage roll $l$, a take-up, motor, or forwarding roll $m$, and for certain mechanisms for operating the same. The shaft $n$ of the motor-roll is provided with an angle gear-wheel $o$, which meshes with a similar wheel $p$ on a hand-shaft $q$, the said hand-shaft being arranged in suitable bearings $q^2$ $s$ and extending forward from said angle-gearing through the front board $r$ of the desk to a point where it may receive a handle and be easily and conveniently manipulated by the clerk or attendant. Said hand-shaft is preferably in two parts, as shown in Figs. 2, 7, and 8, $v$ being a key or handle portion which has a limited sliding movement on the main portion $q^3$ of said shaft, but which is prevented from turning pivotally on said shaft by a key or feather $w$, working in a slot $a'$, as shown in Fig. 7. The movable handle is held in a normal relation to the main portion of the shaft by a spring $b'$, Fig. 2, arranged in any proper position to secure the desired result. Projecting from the hand-shaft at a point just inside of the front board of the desk is a cross-bar $c'$, Figs. 2 and $3^a$. This engages a lever $d'$, secured on the said front board or elsewhere in any suitable manner. Said lever engages with a lock or latch bolt $e'$, Fig. $3^a$, arranged to engage with a suitable lock-plate or co-operating catch $f'$ on the front board $g'$ of the drawer and hold the said drawer from being opened. By turning the hand-shaft pivotally the motor-roll is revolved and the recording-ribbon moved rearward beneath the glass, so that the last entry on said ribbon made while the paper was lying on the bearing $j^2$ at the slot at the end of the glass $i$, Fig. 1, is protected from subsequent change. At the same time the projecting arm or bar $c'$ engages the lever $d'$, depressing the same and raising the bolt $e'$, so that the cash-drawer may be opened automatically under the influence of the spring hereinafter referred to.

To prevent the projecting bar $c'$ from stopping at a point where it will interfere with the movement of the lever $d'$ and the dropping of the bolt $e'$ into locking relation to the drawer when the latter has been forced backward by the hand of the operator after the completion of a sale, I have provided the plate or bearing $s$ with an incline $i'$, adapted to force the movable portion of the handle longitudinally against the stress of the spring $b'$, and a short and abruptly-inclined plane or bearing $k'$, which, in connection with the spring $b'$, throws the said cross-bar past the obstructing-point. Adjacent to the incline $k'$ is a stop projection $l'$ on the bracket or bearing $s$, which limits the pivotal movement of the shaft by the hand, so that the turns will be uniform and the movements of the paper to receive its entry will be of the same length.

To turn the shaft the handle is pressed inward against the spring $b'$ until the projection $c'$ passes and is released from the stop projection $l'$. The handle can then be turned pivotally to secure the desired movement of the ribbon and lock or latch bolt. The said projection $l'$ then rises over the long incline, passes over the ridge, and onto the abrupt incline, when the spring is allowed to act freely and force the projection against the stop $l'$ over the obstructing-point above referred to.

To prevent the lever $d'$ from being thrown out of position by the action of the spring $w'$, Fig. $3^a$, on the lever $p'$ and bolt $e'$, the latter of which engages the said lever $d'$, so that the action of the spring $w'$ may be transmitted to said lever and throw it out of position to be properly engaged by the projection $c'$, I have provided a suitable stop $j'$. This may be fastened on the front board of the desk and be arranged to engage the lever $d'$ or be otherwise arranged to accomplish the desired result.

In connection with the means described for advancing the recording-ribbon and releasing the cash-drawer I have provided means for indicating the time of an entry. This consists, preferably, of a stationary disk $m'$ and a dial-clamp arranged on the ordinary hand-arbor and actuated by clock mechanisms of any ordinary construction. The clamp is provided with a paper dial $o'$, having time-indicating marks thereon, and the line-indications are made by a perforator or indenter $o^2$ for punching said paper disk when the bolt $e'$ is raised and the drawer unlocked. As the paper disk or dial revolves on the stationary disk or table $m'$ the time-indicating marks are in turn brought beneath the punch or indenter, and when the latter is operated an indentation or perforation is made at or near one of said time-marks, by means of which the time of the opening of the drawer will be shown.

The indenter or perforator is preferably a small punch operated by a lever $p'$, fulcrumed at $q'$ on a suitable bracket $r'$. Said lever is engaged by the bolt $e'$, and is raised thereby at one end and the perforating end lowered into engagement with the paper, as will be understood. The punch $o^2$ after passing through the dial-paper passes into a suitable notch or recess $m^3$, Figs. 11 and 12.

To throw open the drawer automatically when the bolt $e'$ is withdrawn, I have provided the inner end of said drawer with a socket $s'$, Fig. 5, a spring $t'$, and a rod $u'$, held in said socket and extending into engagement with the rear board of the desk. The said socket, spring, and rod are arranged at about the center of the drawer, and thus by a straight pressure the drawer is forced outward without danger of binding because of lateral movement. The spring bears against the inner end of the socket and against a shoulder $v'$ on the rod, so that when the drawer is closed it is closed against the power of the spring $t'$. When the drawer is unlatched, the spring forces the same outward, as will be understood.

To prevent the hand-shaft and the parts depending thereon for movement from being turned backward, I have provided a ratchet-and-pawl attachment $a^3$ $a^4$, Figs. 2 and 6. When the pawl is in engagement with the ratchet-wheel, the latter can be turned in but one direction, and this is normally the case when the desk-cover is closed down, the said cover engaging the end of the spring $a^5$, Fig. 6, and forcing the same down and the pawl into engagement. When the desk-cover is opened and pressure removed from the spring $a^5$, a weaker spring $a^6$ is allowed to act to raise the pawl from the ratchet, so that the paper-forwarding mechanisms may be worked in either direction in adjusting the paper.

To secure the paper in the motor-roll, I prefer to make the same in hinged parts $m^3$ $m^4$, $m^5$ being the hinge-pin connecting the two said parts. One of said parts is provided with a series of pins or lugs $m^6$, Fig. 4, which enter suitable recesses on the opposite part. The end of the paper is clamped between the said parts and held by the lugs, and the parts are prevented from opening by turning the paper around the roll once or twice. After securing the paper, which is preferably done after removing the roll from its bearings, the said roll is returned to its bearings. (Shown more clearly in Figs. 9 and 10.)

The journals of the motor-roll are formed as shown in Fig. $3^b$, $m^{10}$ being narrow or contracted portions, $m^{13}$ enlarged portions, and $m^7$ inclined or conical portions connecting the contracted with the enlarged portions. The journal-bearings are provided with enlarged perforations $m^9$, corresponding with the enlarged portions $m^{13}$ of the journal, and $m^8$ are passages or necks through which the narrow or contracted parts of the journals are allowed to pass. When the roll is placed in position, the narrow or contracted parts of the journal are passed through the narrow passages $m^8$, when a spring $m^{11}$ is allowed to act and forces the journal laterally, and the enlarged portions of the journal enter into operative engagement with the bearings at the enlargements $m^9$. The incline $m^7$ allows a lateral movement without catching. By this construction the end of the paper may be fastened into the roll and the roll adjusted into its bearings with great facility and ease.

To allow the hand-shaft to be removed from its bearings readily, I have provided the rear bracket $q^2$ with a pin $q^5$, Figs. 13 and 14, which enters a peripheral groove in the hand-shaft and thus prevents longitudinal movement. By removing the wheel $p$ from the shaft $q$ the latter will be free to be drawn out of its bearings when not keyed in place by the pin $q^5$. The pin $q^5$ is provided with a finger-piece (shown in Fig. 14) to enable the pin to be easily withdrawn.

Having thus described the invention, what I claim as new is—

1. In a cash-registering device, the combination, with the frame $k$, having bearings $m^9$ $g$, of a motor-roll having contracted parts $m^{10}$ and enlargements $m^{13}$, and a spring $m^{11}$, bearing laterally on said roll, substantially as set forth.

2. In a cash-registering device, the combination, with a hand-shaft having angle gear-wheel $p$ thereon, of a removable motor-roll having a co-operating wheel, and a spring $m^{11}$, adapted to force said roll and its wheel endwise into engagement with said wheel $p$, substantially as and for the purposes set forth.

3. In a cash-registering device, the combination, with a hand-shaft having an angle gear-wheel at its inner end, of a motor-roll removable from its bearings in said device, and provided at one end with a gear-wheel $o$, clamping mechanism at the middle, and at its opposite end provided with or engaging means for holding said roll in its bearings and in engagement with said angle gear-wheel, substantially as and for the purposes set forth.

4. In combination with the desk having partition $b$ and drawer $e$, said desk being provided with an opening $h$ in the cover thereof, a frame $k$, having rolls $l$ and $m$, the latter having gearing for transmitting power from the hand-shaft, said hand-shaft having a projection $c'$, a bearing $s$, having a long incline $i'$ and an opposite short incline $k'$ and stop $l'$, a lever $d'$, and bolt $e'$, adapted to engage a co-operating plate $f'$ on the drawer, substantially as and for the purposes set forth.

5. In combination with a cash-drawer and its receptacle, ribbon-rolls, a pivotally-movable hand-shaft geared to one of said rolls, the said hand-shaft having a longitudinally-movable handle and a projection $c'$, a lever $d$, fulcrumed at the front of the desk and engaging a lock or latch bolt for locking the drawer and said bolt, and a bearing provided with inclines and a stop projection, all said parts being arranged and adapted to operate substantially as and for the purposes set forth.

6. In a cash-registering device, the combination, with a motor-roll and a hand-shaft geared to the same and provided at its forward end with a longitudinally-movable handle or key, of a feather or key $w'$ to prevent pivotal movement, a spring $b'$, bearing $s$, having inclines and stop, as described, a lever $d'$, bolt $e'$ for locking the drawer, a lever $p'$, operating a punch, and a paper dial and disk, said parts being arranged and combined substantially as and for the purposes set forth.

7. In a cash-registering device, the combination, with the frame $k$, having a feed-roll, perforations $m^9$, and passages $m^8$ thereto, of a removable motor-roll with journals contracted, as at $m^{10}$, and enlarged at $m^{13}$, a spring $m^{11}$, and means for operating the motor-roll, substantially as and for the purposes set forth.

8. In a cash recorder and registering device, the combination, with the drawer locking or latching mechanisms, a recording-ribbon, and a motor-roll for forwarding the same, of a hand-shaft geared to said motor-roll and adapted to move the same when turned by the hand, and provided with a projection $c'$, adapted to engage the lock or latch mechanism to release the drawer, and being in sections, the one having the said projection being longitudinally movable independent of the other, and a bearing $s$, having incline $i'$, all said parts being arranged and combined substantially as and for the purposes set forth.

9. The motor-roll for the recording-ribbon herein described, having the hinged parts $m^3$ $m^4$, the latter being provided at its ends with contracted parts $m^{10}$, inclines $m^7$, enlargements $m^{13}$, and at one end the gear-wheel $o$, arranged and combined substantially as and for the purposes set forth.

In testimony that I claim the foregoing I have hereunto set my hand this 25th day of February, 1890.

STEPHEN MESSERER.

Witnesses:
CHARLES H. PELL,
OSCAR A. MICHEL.